United States Patent
Truxa et al.

(10) Patent No.: US 7,095,388 B2
(45) Date of Patent: Aug. 22, 2006

(54) METHOD AND SYSTEM FOR DEVELOPING CONSISTENCY OF MOTION

(75) Inventors: Les Truxa, Toronto (CA); Don Wilson, Toronto (CA)

(73) Assignee: 3-DAC Golf Corporation, Ontario (CA)

( * ) Notice: Subject to any disclaimer, the term of this patent is extended or adjusted under 35 U.S.C. 154(b) by 393 days.

(21) Appl. No.: 10/113,935

(22) Filed: Apr. 2, 2002

(65) Prior Publication Data

US 2003/0031358 A1 Feb. 13, 2003

Related U.S. Application Data

(60) Provisional application No. 60/280,155, filed on Apr. 2, 2001.

(51) Int. Cl.
G09G 5/00 (2006.01)
(52) U.S. Cl. .......................... 345/7; 345/473; 434/262; 437/222
(58) Field of Classification Search ............... 345/7–9, 345/473–475; 434/247, 249, 252, 262, 274; 473/221, 257, 222
See application file for complete search history.

(56) References Cited

U.S. PATENT DOCUMENTS

| | | | |
|---|---|---|---|
| 2,494,000 A | 1/1950 | Robertson | 35/29 |
| 3,145,484 A | 8/1964 | Bayley | 35/29 |
| 3,197,888 A | 8/1965 | Held | 35/29 |
| 3,353,282 A | 11/1967 | Sneed | 35/29 |
| 3,408,750 A | 11/1968 | McCollough et al. | 35/29 |
| 3,820,133 A | 6/1974 | Adorney et al. | 354/60 |
| 3,846,704 A | 11/1974 | Bessette | 325/66 |
| 4,005,261 A | 1/1977 | Sato et al. | 358/83 |
| 4,015,344 A | 4/1977 | Michaels et al. | 35/29 |
| 4,137,566 A | 1/1979 | Haas et al. | 364/410 |
| 4,163,941 A | 8/1979 | Linn, Jr. | 324/178 |
| 4,267,728 A | 5/1981 | Manley et al. | |
| 4,337,049 A | 6/1982 | Connelly | 434/247 |
| 4,508,510 A | 4/1985 | Clifford | 434/247 |
| 4,545,576 A | 10/1985 | Harris | 273/25 |
| 4,607,843 A | 8/1986 | Signoretti | 273/54 |
| 4,657,250 A | 4/1987 | Newland et al. | |
| 4,740,838 A | 4/1988 | Mase et al. | |
| 4,814,896 A | 3/1989 | Heitzman et al. | |
| 4,828,500 A | 5/1989 | Seidel et al. | 434/247 |
| 4,891,748 A | 1/1990 | Mann | 364/410 |
| 5,111,410 A | 5/1992 | Nakayama et al. | 364/551.01 |

(Continued)

FOREIGN PATENT DOCUMENTS

DE 41 39 275 C1 1/1993

(Continued)

OTHER PUBLICATIONS

Norman, Greg, "Bionic Swing." *Golf Magazine*, Jun. 1985, pp. 67-69.

(Continued)

*Primary Examiner*—Richard Hjerpe
*Assistant Examiner*—Kevin M. Nguyen
(74) *Attorney, Agent, or Firm*—Pillsbury Winthrop Shaw Pittman, LLP

(57) ABSTRACT

A method and system for improving the physical skills of a user performing a given activity. In the method and system, processed images of the user during the performance of the activity are gathered and displayed to the user in real-time using a viewer. Images are generated of an idealized instructional performance of the activity. The generated images are simultaneously displayed with the gathered and processed images, and may be customized to the physical characteristics of the user.

41 Claims, 6 Drawing Sheets

U.S. PATENT DOCUMENTS

| | | | | |
|---|---|---|---|---|
| 5,184,295 | A | 2/1993 | Mann | 364/410 |
| 5,249,967 | A | 10/1993 | O'Leary et al. | 434/247 |
| 5,486,001 | A | 1/1996 | Baker | 273/183.1 |
| 5,513,991 | A | 5/1996 | Reynolds et al. | 439/81 |
| 5,554,033 | A | 9/1996 | Bizzi et al. | 434/247 |
| 5,603,617 | A | 2/1997 | Light | 434/252 |
| 5,616,030 | A | 4/1997 | Watson | |
| 5,638,300 | A | 6/1997 | Johnson | 364/551.01 |
| 5,647,747 | A | 7/1997 | Macri et al. | |
| 5,697,791 | A | 12/1997 | Nashner et al. | |
| 5,772,522 | A | 6/1998 | Nesbit et al. | 473/222 |
| 5,781,437 | A | 7/1998 | Wiemer et al. | |
| 5,797,805 | A | 8/1998 | Lubell et al. | 473/266 |
| 5,823,786 | A | 10/1998 | Easterbrook | 434/247 |
| 5,823,878 | A | 10/1998 | Welch | |
| 5,846,086 | A | 12/1998 | Bizzi et al. | 434/247 |
| 5,857,855 | A | 1/1999 | Katayama | 434/247 |
| 5,868,578 | A | 2/1999 | Baum | |
| 5,890,906 | A | 4/1999 | Macri et al. | 434/247 |
| 5,904,484 | A | 5/1999 | Burns | 434/252 |
| 5,947,742 | A | 9/1999 | Katayama | 434/247 |
| 5,984,684 | A | 11/1999 | Brostedt et al. | 434/252 |
| 6,033,228 | A | 3/2000 | Ladin | |
| 6,068,559 | A | 5/2000 | Lubell et al. | 473/266 |
| 6,126,449 | A | 10/2000 | Burns | 434/252 |
| 6,514,081 | B1 * | 2/2003 | Mengoli | 434/252 |
| 6,774,885 | B1 * | 8/2004 | Even-Zohar | 345/156 |
| 2002/0155417 | A1 | 10/2002 | Browne et al. | |
| 2003/0044757 | A1 | 3/2003 | Tarry et al. | |

FOREIGN PATENT DOCUMENTS

| | | |
|---|---|---|
| GB | 2175508 A | 1/1986 |
| WO | WO 93/00970 | 1/1993 |
| WO | WO 98/25250 | 6/1998 |
| WO | WO 00/40309 A3 | 7/2000 |

OTHER PUBLICATIONS

Ruby, Daniel, "Biomechanics." *Popular Science*, Jan. 1982, pp. 58-60.

Suttie, James K., *A Biomechanical Comparison Between A Conventional Golf Swing/Learning Technique and a Unique Kinesthetic Feedback Technique*, Dissertation, Middle Tennessee State University, May 1983, pp. 1-25 and 178-396.

Nicklaus, Jack, *The Jack Nicklaus Academy of Golf*, Grand Cypress Resort, Orlando, Florida, pp. 1-3.

Simcoe, D.D., "Interactive Video Today", Instructional Innovator, vol. 28 (No. 8), p. 12-13, Nov. 1983.

Sabel, J.C., "Optical 3D Motion Measurement," IEEE Instrumentation and Measurement Technology Conference & IMEKO Technical Committee 7, Conference Proceedings, vol. 1, p. 367-370, Jun. 4-6, 1996.

Gurdijos, P. et al., "Automatic Analysis of Scenes of Group Sports-Specification of a Multivisualization System", IRIT, Univ. Paul Sabatier (Toulouse, France), p. 241-250, Feb. 7-11 (1994).

Iwatsubo, T. et al., "Research on Optimum Design of a Golf Club", Nippon Kikai Gakkai Ronbushu, C. Hen/Transactions of the Japan Society of Mechanical Engineers, Part C, vol. 56 (No. 529), p. 2386-2392 (1990).

Shimoda, S. et al., "Electronic Studio Sets Controlled by Computer," ACM 18th Annual Computer Science Conference, Washington, D.C., p. 439 (Feb. 20, 1990).

Inokuchi, S. et al., "New Image Technologies in LIST (Laboratories of Image Information Science and Technology)," Osaka Graduate School, p. 1-6 (1997).

Matsui, K. et al., "A Virtual Camera System Generating Soccer Scenes from an Arbitrary Point of View", The Institute of Electronics, Information and Communication Engineers, vol. 97 (No. 595), p. 15-22 (1998).

Akio, F. et al., "Broadcasting Technology and Audio Image," Japan Broadcast Corporation, vol. 7 (No. 9), p. 9-10 (1996).

Nakasuga, M. et al., "The 3D-Measurement of Golf Club Head Movement", Asics Corp., Nippon Kikai Gakkai Supotsu Kogaku Shinpojiumu, Shinpojiumnu Hyuman, Dainamikusu Koen Ronbunshu, p. 166-169 (1996).

Yoshikawa, G. et al., "A Spherical Model Analyzing Shoulder Motion in Pitching in Cases of Baseball Players With Bennett's Lesion", The Shoulder Joint, vol. 18 (No. 1), p. 60-67 (1994).

Chikatsu, H. et al., "Utilization of a Video Theodolite System for Dynamic Analysis of Human Motion", Journal of the Japan Society of Photogrammetry and Remote Sensing, vol. 33 (No. 3), p. 77-80 (1994).

Ando, K., "The State of the Art on Image Instrumentation with Use of High Speed Video Technology for Biomechanics", NAC Incorporated, Nippon Gakkai Supotsu Kogaku Shinpojiumu Koen Ronbunshi, p. 90-94 (1993).

Nishioka, T., "Newspaper Applications of Hi-Vision Printing," Imaging Research Laboratory, Technical Research Institute, ITEJ Technical Report, vol. 16 (No. 58), p. 37-42 (Sep. 1992).

Sasaki, N. et al., "The Marathon Image Processing System With the Universal DSP", Journal Institute of Television Engineers of Japan, vol. 45 (No. 10), p. 1230-1239 (1991).

Iwatsubo, T. et al, "Research on Optimum Design of Golf Club (Influence of Shear Modulus of Club Shaft on Twist of Club Head)," Kobe University, Nippon Gakkai Supotsu Kogaku Shinpojiumu Koen Ronbunshi, vol. 199 (No. Spo), p. 121-124 (1990).

Ogura, I., "Image Quality of Electric Still-Camera", University of Tokyo Institute of Industrial Science, Terebijon Gakkai Gijutsu Hokoku, vol. 8 (No. 34), p. 13-18 (1994).

Chikatsu, H., "A Study on the Dynamic Analysis of Human Motion Using Video Imagery", Annual Report, Research Institute for Technology, Tokyo Denki University, No. 15, p. 107-112 (1996).

Kato, D. et al., "Analysis of the Camera Work and Eye Movement of Broadcasting-Sports Cameramen", The Institute for Electronics, Information and Communication Engineers, vol. 96 (No. 116), p. 123-128 (1996).

Chikatsu, H. et al., "A Study on Utilization of Video Theodolite for Dynamic Analysis of Human Motion With Sequential Images", Journal of Japan Society of Photogrammetry and Remote Sensing, vol. 34 (No. 3), p. 20-28 (1995).

* cited by examiner

METHOD AND SYSTEM FOR DEVELOPING CONSISTENCY OF MOTION

This application claims the benefit of U.S. provisional application No. 60/280,155, filed Apr. 2, 2001.

BACKGROUND OF THE INVENTION

Field of the Invention

The invention relates to methods and systems for developing, training and coordinating the body motions and muscle controls necessary to improve an individual's physical mechanics in performing an activity. More specifically, embodiments of the present invention relate to methods and computer-based systems for providing real-time three-dimensional feedback to users and instructors in a manner that enables the user to improve a specific physical skill, such as a golf swing, and provides instructors with an additional tool for analyzing a student's movements during the performance of the activity.

BACKGROUND INFORMATION

Many physical activities involve the repetition of a sequence of body movements. It is typically desirable for individuals performing such activities to improve the manner and consistency with which the sequence of body movements is performed. One such activity that falls within this realm is the game of golf. To excel in golf, most golfers practice swinging a golf club so as to eliminate flaws and to develop a more consist swing.

One traditional method for improving an individual's performance of a given activity, such as golf, is for an instructor to watch the individual perform the activity and then to provide verbal advice on how to improve the individual's mechanics. This method is less than completely successful for various reasons. One shortcoming of this method is the difficulty that many individuals have in visualizing the necessary changes that must be made based solely on the verbal instructions. Training based on visual instructions has been shown to be more effective in improving physical mechanics. Another shortcoming of this method is the need for one-on-one instruction over an extended period of time. As a result, a given instructor can only provide instruction to a very limited number of students, thereby decreasing the availability of instructors and increasing the cost of instruction. This method is also inherently subject to unequal instruction. The quality of the instruction is entirely dependent upon the quality of the instructor. Combined with the limitations on the availability of each instructor just discussed, high caliber instructions are difficult to come by and may be expensive when available.

Another traditional method for improving an individual's performance of a given activity which is often used in conjunction with the previously described method is for the individual to watch an instructor perform the activity and then for the individual to attempt to duplicate what was seen. This method is very instructor intensive and the quality of the instruction is heavily instructor dependent. Another drawback of this method is the disparity in the size of the instructor vis-a-vis the student. Often times, the student will find it difficult to mimic the instructor due to differences in the size of the instructor and the student. Furthermore, this method is not well suited to novice students who may be unable to appreciate the often subtle distinctions between a proper performance of the activity and an improper performance of the activity.

U.S. Pat. No. 4,891,748, issued to Mann, discloses a system that provides an instructor that has the specific physical characteristics of the student. Mann accomplishes this object by recording video of the student performing the physical skill. A computer-generated model is superimposed over the recorded video and the combined video is later viewed by the student so that the student can compare his movements to a computer generated superior performer. Mann bases the computer model on the composite average movements of a plurality of performers performing the same skill. However, in Mann, the delay between the actual performance and the viewing of the compared images prevents the student from getting a feel for the changes that need to be made in the mechanics of the performance of the activity.

U.S. Pat. No. 5,904,484, issued to Burns discloses a method and system in which a monitor is configured for student viewing while performing the selected motion. The monitor simultaneously displays in, real time, a combination of a background sequence and an image sequence in which the background sequence is fed from a camera and the image sequence is a recording of an individual performing the motion. The Burns method and system has several disadvantages. For example, in Burns, the awkwardness of the video display often times will distract the student when performing the activity. Also, real instructors who may not have the same physical characteristics as the students are used as models to illustrate the motion.

SUMMARY OF THE INVENTION

Systems and methods consistent with the principles of the present invention, as embodied and broadly described herein, overcome some of the limitations indicated above by providing systems and methods for developing, training and coordinating an individual's body motions and muscle controls to improve the individual's physical skills in the performance of a given activity.

In an embodiment of the present invention, generated images of an instructional performance are archived in a manner that permits their instant recall when needed. These images may be computer-enhanced images of a selected individual performing the activity that the student wishes to improve. At least one recorder is positioned to register images of the student during the performance of the activity. The registered images of the student are relayed to a processing station that is electrically connected to the recorder. The processing station superimposes the generated images over the registered images or vice-versa and relays the combined images to a direct-sight viewer that may be mounted on the head of the student. The student is thereby able to view the combined images in real-time as he or she performs the activity without having to alter his or her viewing angle or head position. These images can also be relayed to a separate viewer that enable others such as instructors to view what the student is viewing. Such viewing can be either simultaneous or delayed.

In another embodiment, multiple recorders may be positioned at various user selectable angles with respect to the student. Based upon this configuration, the student is permitted to changeably select any of the recorded images from the multiple recorders to appear in the direct-sight viewer. The superimposed generated image may be displayed in a manner to appear to be aligned with the selected recorder angle.

In another embodiment, real-time three-dimensional feedback may be provided to the student in a manner that does not require the student to alter the manner in which the activity is performed. For instance, in the performance of a golf swing or in the performance of a portion of a golf swing, the student will ideally have his or her head positioned in a certain preferred manner. Having the head moved so much as ten degrees in any direction away from the preferred position can cause a complete breakdown in the student's physical mechanics.

BRIEF DESCRIPTION OF THE DRAWINGS

The above and other features and advantages of the present invention are further described in the detailed description which follows, with reference to the drawings, and by way of a non-limiting exemplary embodiment of the present invention, wherein like reference numerals represent similar parts of the present invention throughout the several views and wherein.

DETAILED DESCRIPTION

The following detailed description of the present invention refers to the accompanying drawings that illustrate exemplary embodiments consistent with this invention. Other embodiments are possible and modifications may be made to the embodiments without departing from the spirit and scope of the invention. Therefore, the following detailed description is not meant to limit the invention.

The embodiments described below may be implemented in many different embodiments of software, firmware, and hardware in the entities illustrated in the figures. The actual software code or specialized control hardware used to implement the present invention is not limiting of the present invention. Thus, the operation and behavior of the present invention will be described with the understanding that modification and variations of the embodiments are possible, given the level of detail present herein.

With reference to the drawings, embodiments of present invention provide for a method and system for enabling a user or student to improve his or her physical skills/mechanics in performing a given activity either with or without the assistance of an instructor.

Figure 1:
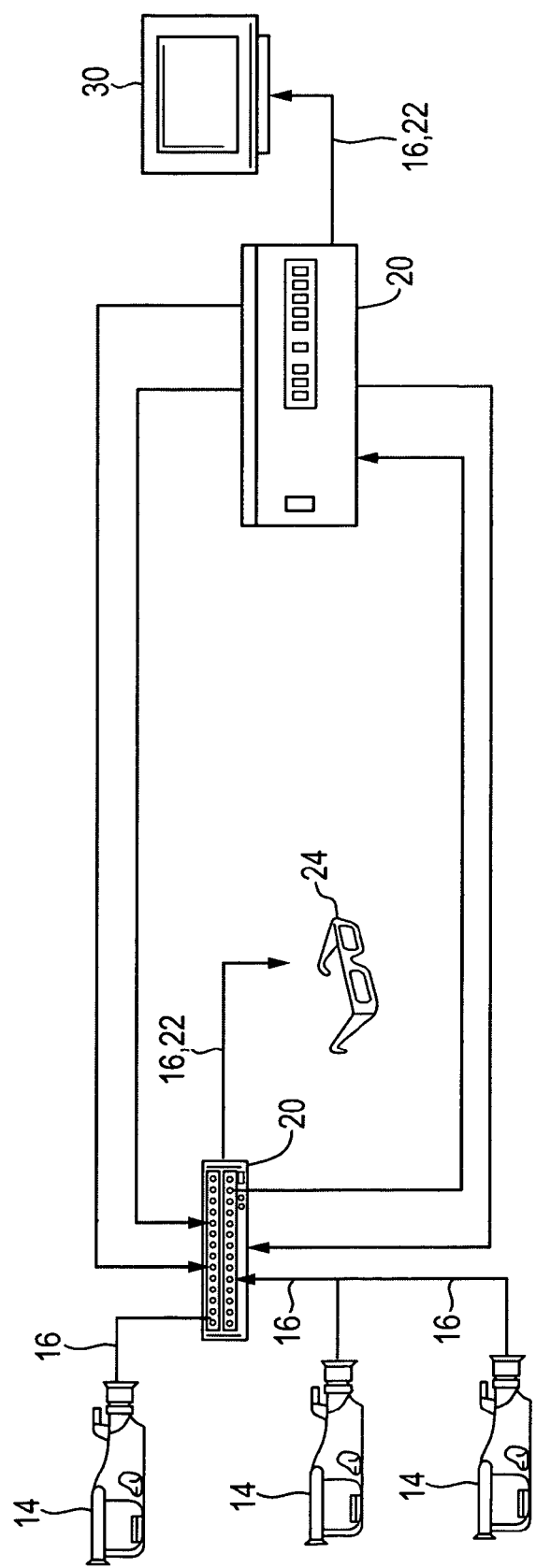
FIG. 1 is a diagram representing a system in accordance with an embodiment of the present invention.

In FIG. 1, at least one recorder 14 is positioned so as to register images 16 of a student during the performance of a given activity. The recorder 14 can be of any type, such as a digital video recorder, which is capable of sufficiently registering images such that the images registered by the selected recorder are viewable in real-time either with or without enhancement. In an alternative embodiment, two or more recorders 14 may be used to provide the student with registered images 16 from more than one perspective from which the student may view his or her movements. One of the recorders 14 may be positioned directly in front of the student to provide the student with the same images as the student would expect to see if he or she were looking into a mirror. The recorder 14 may also be positioned in other positions. For example, recorder 14 may be positioned on either side of the student, behind the student, above the student or underneath the student to provide additional angles having instructional benefits.

In an embodiment, the student may select which of the recorders 14 he wishes to use the feed from and can change the recorder 14 to be used as desired. The role of selecting the recorder 14 may also be performed by an instructor. Additionally, the position and/or the angle of the recorders 14 can be moveably designated by the student or the instructor. Thus, a large number of perspectives can be utilized without requiring the use of a large number of recorders 14.

In an embodiment, the registered images 16 are relayed to a processing station 20 that is electrically connected to the recorders 14. The electrical connection between the recorders 14 and the processing station 20 may be in the form of cables or by use of infrared or other such similar technology for wireless transmission. The processing station 20 incorporates computer hardware operating customized or off-the-shelf computer software and/or firmware. The processing station 20 may be located in close proximity to the student's location. However, the processing station 20 may also be located off-site, in which case, the registered images 16 are relayed to the processing station 20 via an intranet or Internet connection.

In an embodiment, the processing station 20 is capable of accessing generated images 22 of an instructional performance of an activity the student wishes to improve. The generated images 22 may be archived in a manner that permits their instant recall as needed.

The processing station 20 superimposes the generated images 22 over the registered images 16 or vice-versa. The generated images 22 and the registered images 16 may be either combined or simultaneously relayed to a direct-sight viewer 24 mountable on the head of the student. The direct-sight viewer 24 has at least one video display that enables the student to view the combined images 16, 22 in real-time as he or she performs the activity without having to alter his or her viewing angle or head position to do so. In addition, the direct-sight viewer 24 may display the images 16, 22 in a manner that allows the student to view the images 16, 22 at all times during the performance of the activity. The direct-sight viewer 24 may be in the form of virtual reality goggles.

In another embodiment of the present invention, the direct-sight viewer 24 may have replay capabilities to enable the student to replay the combined images 16, 22 that were displayed to the student while the student performed the activity. The replay capabilities of the direct-sight viewer 24 may also enable the student to replay the combined images 16, 22 from his or her performance of the activity derived from one of the recorders 14. The direct-sight viewer 24 may also have slow-motion replay capabilities and freeze-frame capabilities that enable either the student or the instructor to control the replay of the combined-images 16, 22 on command. Another feature that may be incorporated into the slow-motion capabilities of the direct-sight viewer 24 includes a diagramming feature which permits the instructor to remotely add a visual cue to the replayed images so as to direct the student's attention to a particular area of concern.

In another embodiment, the processing station 20 may slightly off set one of the images 16, 22 to enhance, in some instances, the visual cue being provided to the student. Alternatively, the student and/or his equipment may be outfitted with light reflecting devices and/or light emitting devices to provide a visually discernable contrast between the registered images 16 and the generated images 22.

Figure 3:
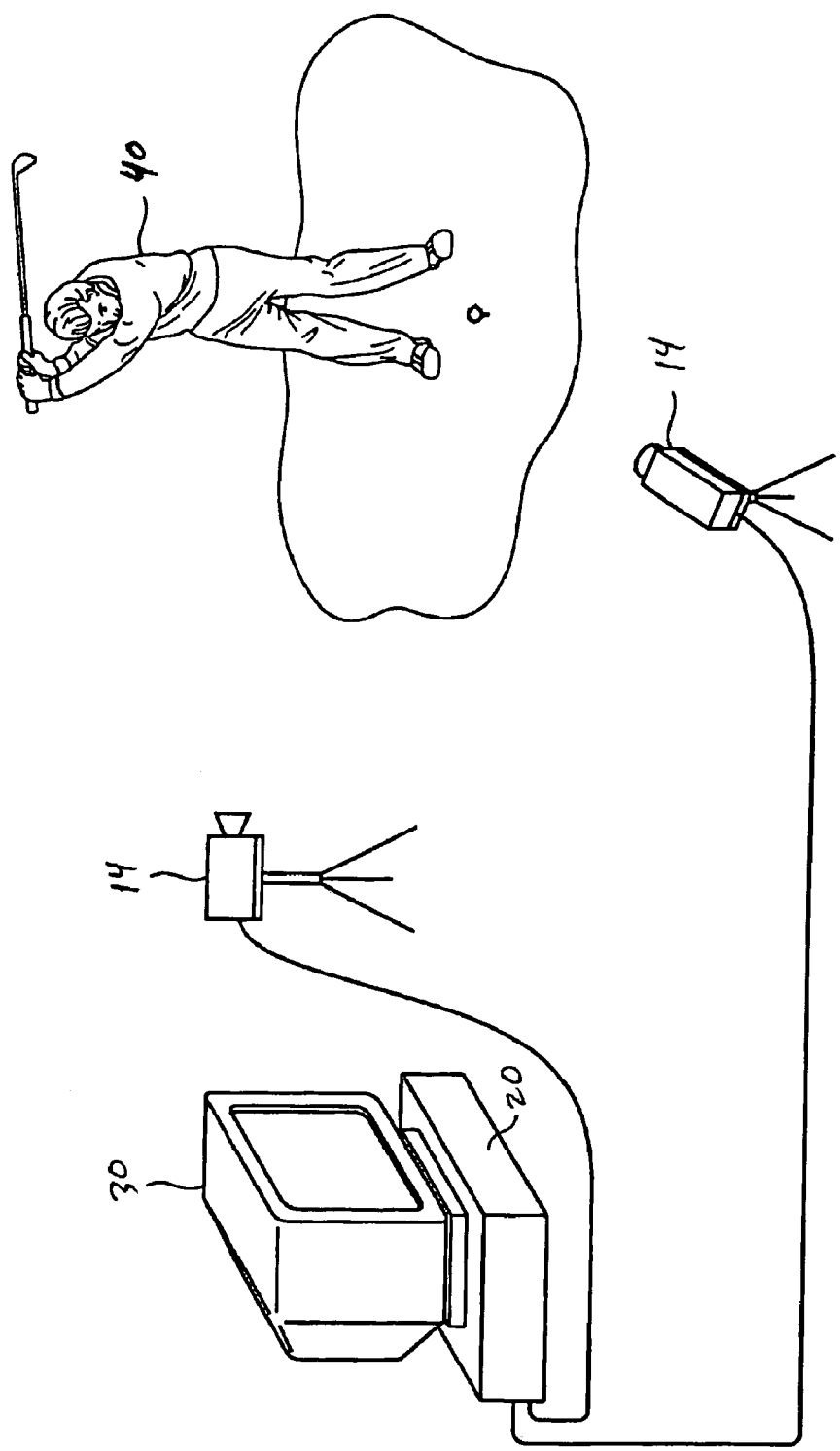
FIG. 3 illustrates a selected individual performing the activity that a student wishes to improve.
Figure 4A:
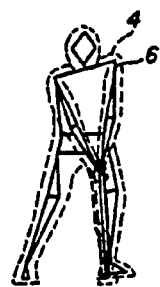
FIGS. 4A–4F illustrate a enhanced images of a three-dimensional model performing the activity in an idealized manner based on ideal positions of a computed generated skeleton.
Figure 4B:
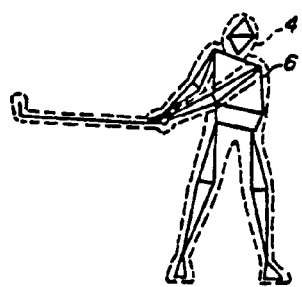
Figure 4C:
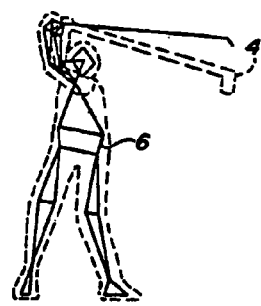
Figure 4D:
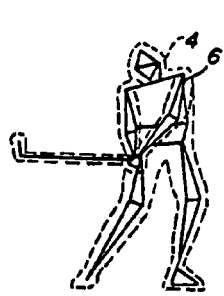
Figure 4E:
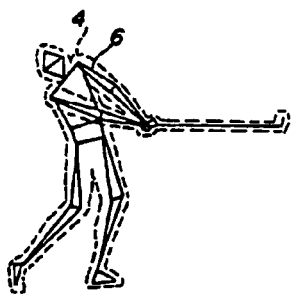
Figure 4F:
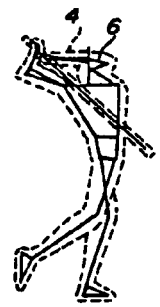
Figure 5A:
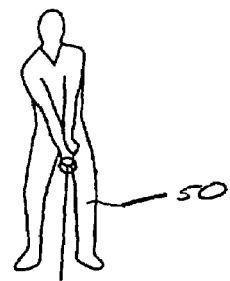
FIGS. 5A–5F illustrate a three-dimensional representation of human skin corresponding anatomically to the enhanced images of FIGS. 4A–4F, respectively.
Figure 5B:
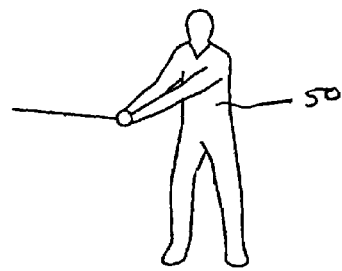
Figure 5C:
Figure 5D:
Figure 5E:
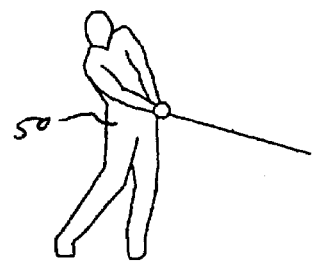
Figure 5F:
Figure 6:
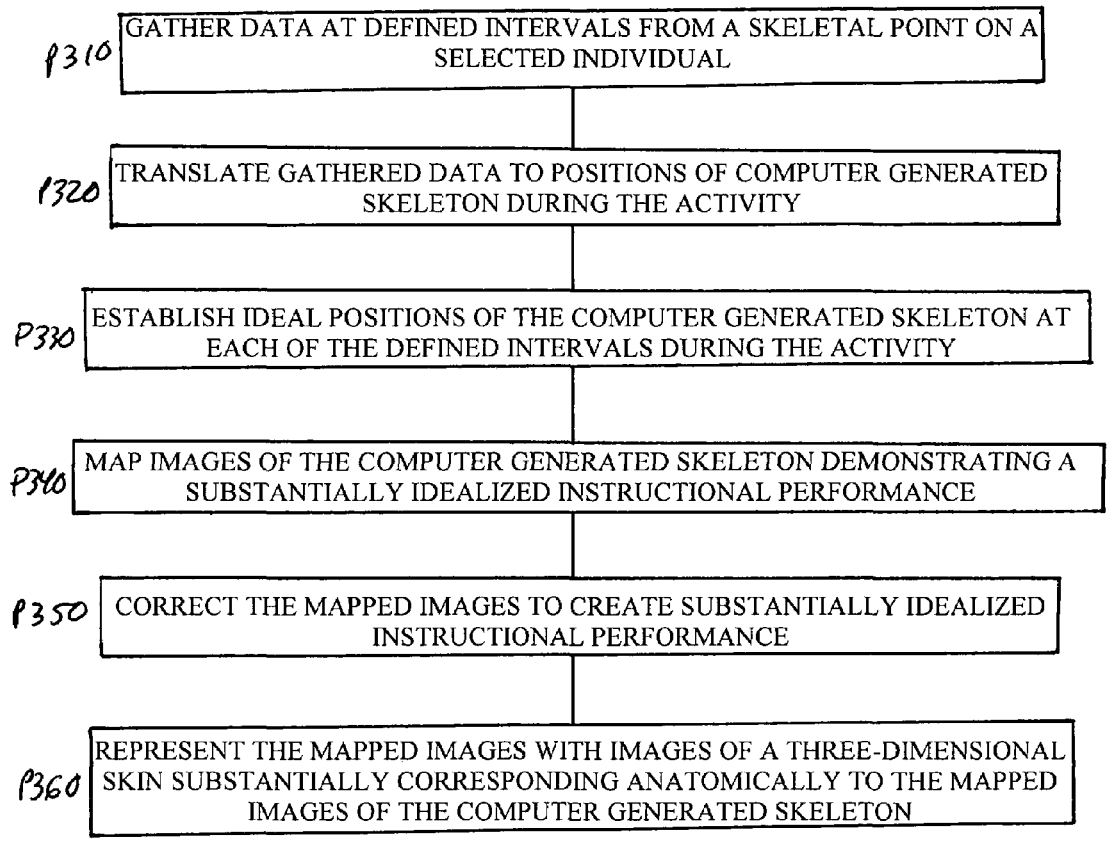
FIG. 6 illustrates a method according to the present invention.

The generated images 22 are computer-enhanced images of a selected individual 40 (FIG. 3) performing the activity that the student wishes to improve. The computer-enhanced images may be created by gathering data from a selected individual performing a given activity and modifying and/or manipulating the gathered data so as to eliminate the undesirable characteristics of the performance of the activity. The manipulated data is then used to engineer images of a three-dimensional model performing the activity in an idealized manner.

Alternatively, referring to FIGS. 4A–6, the computer-enhanced images may be created by gathering data at defined time intervals from at least one skeletal point on at least one selected individual performing the activity in task 310. The gathered data is then manipulated and/or translated in task P320 to establish the ideal positions of the computer-generated skeleton 6 during the performance of the activity in task 330. The manipulated data is then mapped in task P340 and corrected in task P350 to create enhanced images 4 of a three-dimensional model performing the activity in an idealized manner based on the ideal positions of the computer generated skeleton 6 and represented in task 360. A synthetic, three-dimensional representation 50 of human skin corresponding anatomically to the enhanced images 4 of the computer-generated skeleton 6 may be used to replace or cover the computer-generated skeleton. Alternatively, an outline of a model and grid lines may be used to impart three-dimensional information to the student. Grids may also be superimposed on the generated images 22 to accomplish this goal.

The generated images 22 and the computer-enhanced images may be customized in accordance with user specific characteristics such as user height and user weight.

A viewing station 30 may be electrically connected to the processing station 20. The viewing station 30 may be a video monitor capable of displaying the combined images 16, 22 relayed from the processing station 20. As with the electrical connection between the recorders 14 and the processing station 20, the electrical connection between the processing station 20 and the viewing station 30 may be in the form of cables or by use of infrared or other such similar technology for wireless transmission.

The viewing station 30 displays the registered images 16 and the generated images 22 and may benefit the instructor. The viewing station 30 displays the combined images 16, 22 shown to the student in the direct-sight viewer 24. The viewing station 30 may selectively view the combined images 16, 22 from any of the recorders 14 independent of which of the combined images 16, 22 may be viewed by the student in the direct-sight viewer 24. As with the processing station 20, the viewing station 30 may be located in close proximity to the student's location. However, in an alternative embodiment, the viewing station 30 may be located off-site and the registered images 14 may be relayed to the viewing station 30 via an intranet or Internet connection. The location of the processing station 20 and the location of the viewing station 30 may be completely independent of one another. Thus, either or both the processing station 20 and the viewing station 30 may be located off-site. In addition, a second viewing station 30 may be located off-site as well as on-site.

In an embodiment, the processing station 20 may be electrically connected to a direct-sight viewer 24 which has means for displaying to the student the combined images of the registered images 16 and the generated images 22.

Like the direct-sight viewer 24, the viewing station 30 may have replay capabilities that enable the instructor to replay the combined images 16, 22 that were displayed to the student while the student performed the activity. The replay capabilities of the viewing station 30 may also enable the instructor to replay the combined images 16, 22 from the student's performance of the activity derived from any one of the recorders 14 regardless of which images the student may be viewing during the performance of the activity. The viewing station 30 may also have slow-motion replay capabilities and freeze-frame capabilities that enable the instructor 12 to control the replay of the combined-images 16, 22 on-command. Another feature that may be incorporated into the slow-motion capabilities of the viewing station 30 is a diagramming feature to permit the instructor to remotely add a visual cue to the replayed images so as to direct the student's attention to a particular area of concern.

In one embodiment, the processing station 20 may be electrically connected to a direct sight viewer that has means for displaying to the student the combined images of the registered images 14 and the generated images 2.

Either or both the direct-sight viewer 24 and the viewing station 30 may include a first controller for adjusting an intensity of the generated images and a second controller for adjusting a contrast of the generated images. Such first and second controllers may be used to help the student distinguish the registered images 16 from the generated images 22, particularly where some difficulty such as poor lighting and/or undesirable clothes color may make distinguishing the two images difficult.

In another embodiment, the method and system of the present invention includes means for indicating deviation between the registered images 16 and the generated images 22. The direct-sight viewer 24 may provide a visual indication of the deviation. For example, the processing station 20 may utilize computer software to superimpose a graphic over the combined images 16, 22 to indicate where the registered images 16 and the generated images 22 do not overlap. Such a graphic may be selectively incorporated into the combined images 16, 22 displayed in either the direct-sight viewer 24 or the viewing station 30 or both.

The method and system may further include means for selectively saving and replaying the registered images of the user. By having such images available for later review, the images can be manipulated to enhance the level of instruction being provided.

In another embodiment of the present invention, at least one tracer may be positioned on the user to provide a visual cue to the user. The tracers may have light-emitting capabilities and/or light-reflecting capabilities, such that the tracers can be used in conjunction with, or in place of, the controllers.

In another embodiment, the present invention may include means for providing audible instructions to the user. Student-prompted and/or computer-generated audible instructions may be used to replace the role of a live instructor.

Figure 2:
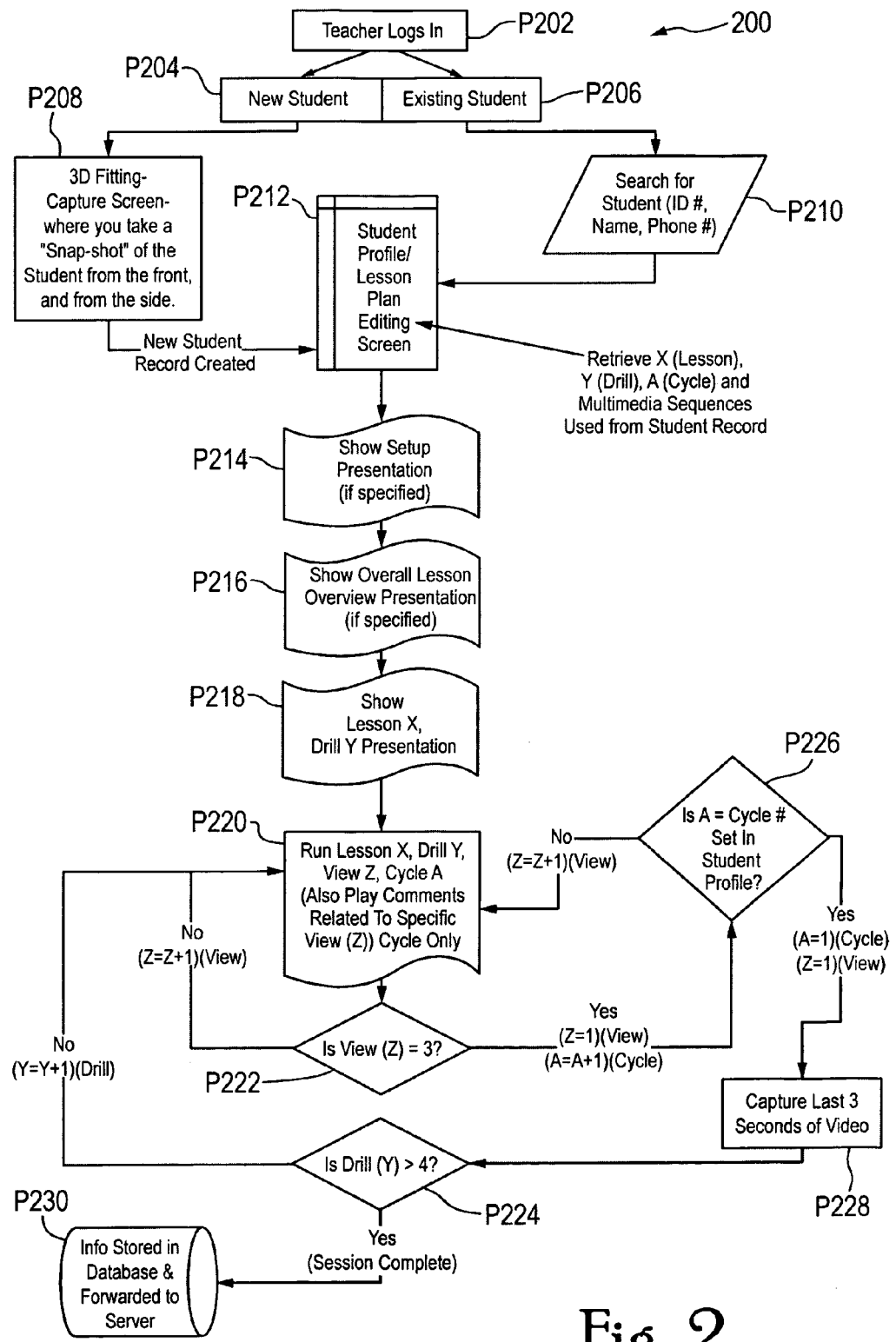
FIG. 2 illustrates a method according to an embodiment of the present invention.

FIG. 2 is a block diagram illustrating a method 200 of the present invention, as disclosed in FIG. 1. The method begins when the teacher logs in at P 202. If the student is an existing student, then the process continues to P206.

FIG. 2 illustrates a method 200 according to an embodiment of the present invention. In task P202, a user, such as a teacher or student, logs in to a processing station or computer interfaced with the processing station. The user may indicate via an input whether a student is an existing student or a new student. If the student is an existing student (task P206), then the process continues to task P210.

In task P210, information used to identify the existing student is searched to retrieve the existing student's profile. The information may include, for example, an assigned identification number, name, or phone number. The process then continues to task P212.

If the student is a new student (task P204), then the process continues to task P208. In task P208, a new student profile is created. The profile may contain predetermined data on the new student, such as, for example, identification number, name, or phone number. In addition, images of the student may be captured for further use. In particular, images of the student may be taken from various perspectives, such as front and side of the student. Such multimedia images may be stored in the student's profile. The process continues to task P212.

In task P212, a user interface may be displayed. The interface may display a student profile and allow for loading, creating, and editing of student profiles. The interface may also display lesson plans and facilitate the creation, editing, selection, and activation of lesson plans.

In one embodiment, a user may organize drills into one or more lessons. Lessons may be associated with particular students or multiple students. A drill may be associated with one or more cycles that represent repetitions of the drill. Each cycle may be associated with one or more views. In one embodiment, views are numbered from 1 to 3. In other exemplary embodiments, 5 drills are included in each lesson. Additionally, a user may select presentations to be optionally shown in conjunction with the running of lessons. For instance, a set-up presentation may provide information for a user, such as general information about the lesson system. A lesson overview presentation may be specifically directed to the lesson in which the user participates. Presentations relating to specific drills may also be played. Presentations may be automatically displayed at various times selected by the user, such as preceding a lesson. Presentations may be of any feasible duration.

In task P214, a setup presentation is shown if specified by the user. In task P216, an overview presentation is shown if specified.

In task P218, a presentation relating to a particular drill Y of a lesson X is shown to a user.

In task P220, a particular view Z of a cycle A is run. The cycle is associated with a drill Y of a lesson X. Running of the view may include the running of various features described above in connection with the system of FIG. 1. During the first cycle of a drill, audio or video comments may be provided relating to the particular view.

In task P222, the method tests whether the view is equal to 3. If not, the view is incremented to the next view and run in task P220. If so, then the view is reset to 1 and the cycle number is incremented. If the cycle number equals a number specified in the user's profile (task P226), then the view and cycle are reset to 1, and the last 3 seconds of user video are captured (task P228). If the cycle number does not equal the specified number (task P226), then the view is incremented and run in task P220.

In task P224, the method tests whether the drill number exceeds 4. If not, then the drill number is incremented to the next drill, and the associated view is run in task P220. If the answer is yes, then all drills for a lesson have been completed, and the lesson session is complete. In task P230, information from the lesson session is stored in a database and forwarded to a server. The process ends.

It is recognized that real-time transmission of images inherently involves delays of many types including those associated with data transfer and computer processing. Thus, the term real-time, as used herein, is used with the understanding that these delays will be present in the invented system and method.

Many improvements, modifications and additions will be apparent to one skilled in the art without departing from the spirit and scope of the present invention as described herein and defined in the following claims.

Therefore, various changes in the details, materials, arrangements or parts and operational conditions which have been described and illustrated in order to explain the nature of the invention, may be made by those skilled in the art and remain within the principles and scope of the invention.

What is claimed is:

1. A system for improving the physical skills of a user performing a given activity, comprising:
   an imaging device for registering a plurality of performance images of a user during a performance of the given physical activity by the user,
   wherein the plurality of performance images are taken from a plurality of viewing perspectives;
   a direct-sight viewer for displaying the registered performance images to the user;
   a processing station electronically connected to the imaging device and to the direct-sight viewer for receiving the registered performance images from the imaging device, receiving a selection of one of the plurality of viewing perspectives by the user, and relaying the registered performance images taken from the viewing perspective selected by the user to said direct-sight viewer in substantially real-time; and
   a plurality of generated images of an instructional performance of the physical activity, wherein the plurality of generated images represent instructional performance from a plurality of viewing perspectives, wherein the processing station superimposes the generated images that represent the instructional performance from a viewing perspective that corresponds to the viewing perspective selected by the user and the registered performance images taken from the viewing perspective selected by the user, wherein the generated images further comprise computer-enhanced images of a three-dimensional model performing the physical activity in an idealized manner, wherein said processing station superimposes said computer-enhanced images over the registered performance images, and wherein the computer-enhanced images are computer-engineered images created by
   gathering data at defined time intervals from at least one skeletal point on at least one selected individual performing the activity;
   translating the gathered data into positions of a computer-generated skeleton during the physical activity;
   establishing ideal positions of the computer-generated skeleton at each of the defined time intervals during the physical activity;
   mapping images of the three-dimensional model performing the activity in an idealized manner based on the ideal positions of the computer-generated skeleton;
   correcting the mapped images thereby creating a substantially idealized instructional performance of the given activity; and representing the mapped images with images of a three-dimensional skin corresponding anatomically to the mapped images of the computer-generated skeleton.

2. The system of claim 1, wherein said imaging device comprises at least one digital video recorder.

3. The system of claim 2, wherein said at least one digital video recorder is positioned directly in front of the user.

4. The system of claim 1, wherein the imaging device further comprises a first imaging unit positioned at a first location with respect to the user, and a second imaging unit positioned at a second location with respect to the user.

5. The system of claim 4, wherein the first location and the second location are designated by the user.

6. The system of claim 1, wherein the imaging device further comprises multiple imaging devices for registering performance images from multiple perspectives relative to the user, wherein the direct-sight viewer selectively displays the registered performance images of at least one of said multiple imaging devices.

7. The system of claim 6, further comprising a viewing station electronically connected to the processing station for displaying the registered performance images and the generated images, wherein the viewing station selectively displays the registered performance images of at least one of the multiple recorders.

8. The system of claim 1, wherein the direct-sight viewer comprises at least one video display.

9. The system of claim 8, wherein the direct-sight viewer further comprises virtual reality goggles having at least one built-in video display.

10. The system of claim 1, wherein the direct-sight viewer is mountable on a user's body.

11. The system of claim 1, wherein the processing station has replay capabilities.

12. The system of claim 1, wherein the processing station has freeze-frame capabilities.

13. The system of claim 1, wherein the processing station has diagramming capabilities.

14. The system of claim 1, wherein the processing station slightly off-sets the generated images and the registered performance images.

15. The system of claim 1, wherein the processing station further comprises a training module for coordinating and managing the user's performance of the physical activity.

16. The system of claim 1, wherein the processing station customizes the generated images in accordance with user specific characteristics.

17. The system of claim 1, further comprising a grid overlaid onto the generated images.

18. The system of claim 1, further comprising a grid overlaid onto the three-dimensional skin images.

19. The system of claim 1, further comprising a viewing station electronically connected to the processing station for displaying the registered performance image and the generated image.

20. The system of claim 19, wherein the viewing station displays the registered performance image and the generated image simultaneously with said direct-sight viewer.

21. The system of claim 1, further comprising a viewing station electronically connected to the processing station for displaying the registered performance images and the computer-enhanced images.

22. The system of claim 21, wherein said viewing station displays the registered performance images and said computer-enhanced images simultaneously with said direct-sight viewer.

23. The system of claim 1, further comprising means for selectively saving and replaying the registered performance images of the user.

24. The system of claim 1, further comprising means for indicating a deviation between the registered performance images and said generated images, wherein said direct-sight viewer provides a visual indication of the deviation.

25. The system of claim 1, wherein the processing station further comprises means for providing audible instructions to the user.

26. The system of claim 1, further comprising at least one tracer positionable on the user for providing a visual cue to the user.

27. The system of claim 26, wherein the at least one tracer has light-emitting capabilities.

28. The system of claim 26, wherein the at least one tracer has light-reflecting capabilities.

29. A machine for improving the physical skills of a user performing a given activity, comprising:
an imaging device for registering a plurality of performance images of the user during the performance of the given activity,
wherein the plurality of performance images are taken from a plurality of viewing perspectives;
a direct-sight viewer for displaying images to the user;
a processing station electronically connected to the imaging device and to the direct-sight viewer for receiving the registered performance images from the imaging device, for receiving a selection of one of the plurality of viewing perspectives by the user, for creating the displayed images from the performance images taken from the viewing perspective selected by the viewer, and for relaying the displayed images to the direct-sight viewer in substantially real-time; and
a plurality of computer-enhanced images of a substantially idealized instructional performance of the activity, wherein the plurality of computer-enhanced images represent the substantially idealized instructional performance of the activity from a plurality of viewing perspectives, wherein said processing station superimposes said computer-enhanced images over the registered performance images, and wherein the computer-enhanced images are computer-engineered images created by
gathering data at defined time intervals from at least one skeletal point on at least one selected individual performing the activity;
translating the gathered data into positions of a computer-generated skeleton during the physical activity;
establishing ideal positions of the computer-generated skeleton at each of the defined time intervals during the physical activity;
mapping images of a three-dimensional model performing the activity in an idealized manner based on the ideal positions of the computer-generated skeleton;
correcting the mapped images thereby creating a substantially idealized instructional performance of the given activity;
representing the mapped images with images of a three-dimensional skin corresponding anatomically to the mapped images of the computer-generated skeleton, and
wherein the displayed images are created by superimposing the computer-enhanced images that represent the substantially idealized instructional performance of the activity from a viewing perspective that corresponds to the viewing perspective selected by the user and the registered performance images taken from the viewing perspective selected by the user.

30. A method for improving the physical skills of a user performing a given activity, comprising:
generating a plurality of computer-enhanced images of an instructional performance of the given activity, wherein the computer-enhanced images are computer-engineered images created by
gathering data at defined time intervals from at least one skeletal point on at least one selected individual performing the activity;
translating the gathered data into positions of a computer-generated skeleton during the physical activity;
establishing ideal positions of the computer-generated skeleton at each of the defined time intervals during the physical activity;
mapping images of a three-dimensional model performing the activity in an idealized manner based on the ideal positions of the computer-generated skeleton;
correcting the mapped images thereby creating a substantially idealized instructional performance of the given activity;
representing the mapped images with images of a three-dimensional skin corresponding anatomically to the mapped images of the computer-generated skeleton,
wherein the plurality of images represent the instructional performance from a plurality of viewing perspectives;
providing the user with a direct-sight viewer;
registering a plurality of performance images of the user performing the given activity using an imaging device, wherein the plurality of performance images are taken from a plurality of viewing perspectives;
receiving a selection by the user of one of the plurality of viewing perspectives;
superimposing the generated images that represent the instructional performance from a viewing perspective that corresponds to the selected viewing perspective over the registered performance images taken from the selected viewing perspective to create combined images; and
transmitting the combined images to the direct-sight viewer thereby displaying the combined images to the user in substantially real time as the user performs the given activity.

31. The method of claim 30, further comprising customizing the generated images based on user characteristics.

32. The method of claim 30, further comprising customizing the mapped images based on user characteristics.

33. The method of claim 30, further comprising customizing the three-dimensional synthetic skin images based on user characteristics.

34. The method of claim 30, further comprising transmitting the combined images to a viewing station thereby simultaneously displaying the combined images on the viewing station for use by an instructor.

35. The method of claim 30, further comprising providing audible instructions to the user during the performance of the activity.

36. A method for improving the physical skills of a user performing a given activity using a computer generated three-dimensional model, comprising:
equipping the user with a body mounted display;
registering performance images of the user performing the given activity from a viewing perspective selected by the user from a plurality of viewing perspectives;
delivering the performance images to the body mounted display in substantially real time;
generating images of a three-dimensional model performing the activity in a substantially idealized manner from the selected viewing perspective; and
delivering the generated images simultaneously with the performance images, wherein generating images of the three-dimensional model comprises
gathering data at defined time intervals from at least one skeletal point on at least one selected individual performing the activity;
translating the gathered data into positions of a computer-generated skeleton during the physical activity;
establishing ideal positions of the computer-generated skeleton at each of the defined time intervals during the physical activity;
mapping images of the three-dimensional model performing the activity in an idealized manner based on the ideal positions of the computer-generated skeleton;
correcting the mapped images thereby creating a substantially idealized instructional performance of the given activity;
representing the mapped images with images of a three-dimensional skin corresponding anatomically to the mapped images of the computer-generated skeleton.

37. The method of claim 36, further comprising initiating a set-up program for providing the user with a comfort level with the computer generated three-dimensional model.

38. The method of claim 36, further comprising providing the user with multiple lessons involving repetitions of the given activity.

39. The method of claim 36, further comprising indicating to the user where the registered performance images and the generated images deviate from one another.

40. A method for creating computer enhanced images demonstrating a substantially idealized instructional performance of a given activity, comprising:
gathering data from at least one skeletal point on at least one selected individual performing the activity;
mapping images of ideal positions of a computer generated skeleton performing the activity using the gathered data;
correcting the mapped images thereby creating images of a substantially idealized instructional performance of the given activity by the computer generated skeleton; and
representing the mapped images with images of a three-dimensional skin substantially corresponding anatomically to the mapped images of the computer generated skeleton.

41. A method for creating computer generated images demonstrating a substantially idealized instructional performance of a given activity, comprising:
gathering data at defined time intervals from at least one skeletal point on at least one selected individual performing the activity;

translating the gathered data to positions of a computer generated skeleton during the activity;

establishing ideal positions of the computer generated skeleton at each of the defined time intervals during the activity;

mapping images based on the ideal positions of the computer generated skeleton demonstrating a substantially idealized instructional performance of the activity;

correcting the mapped images thereby creating the substantially idealized instructional performance of the given activity; and representing the mapped images with images of a three-dimensional skin substantially corresponding anatomically to the mapped images of the computer generated skeleton.

* * * * *